No. 824,199. PATENTED JUNE 26, 1906.
P. P. NUNGESSER.
CARBON CALCINING FURNACE.
APPLICATION FILED SEPT. 18, 1905.
2 SHEETS—SHEET 1.
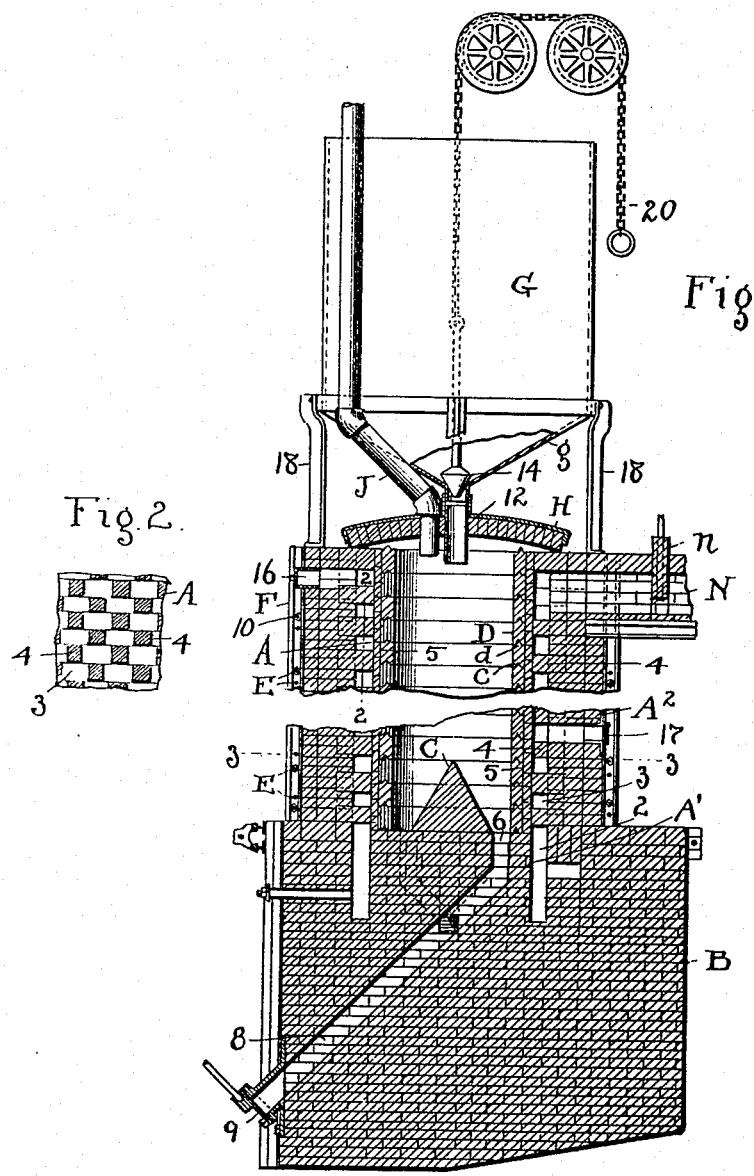
ATTEST.
A. N. Moser.
R. B. Moser
INVENTOR.
Philip P. Nungesser
By H. T. Fisher
ATTY.

No. 824,199. PATENTED JUNE 26, 1906.
P. P. NUNGESSER.
CARBON CALCINING FURNACE.
APPLICATION FILED SEPT. 18, 1905.
2 SHEETS—SHEET 2.
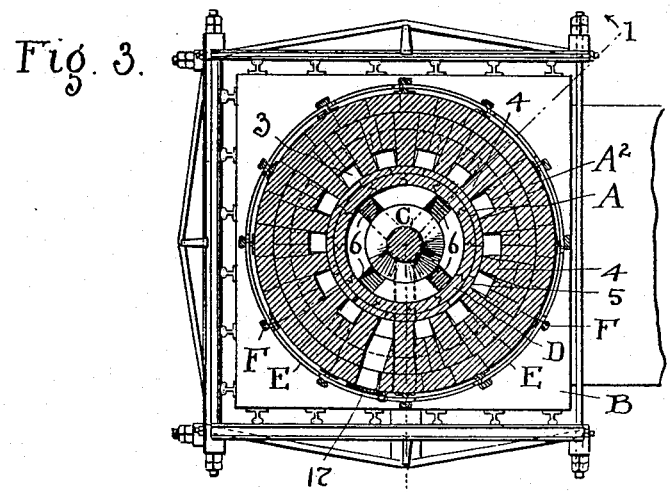
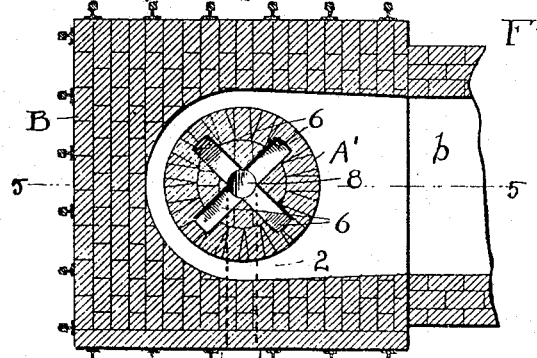
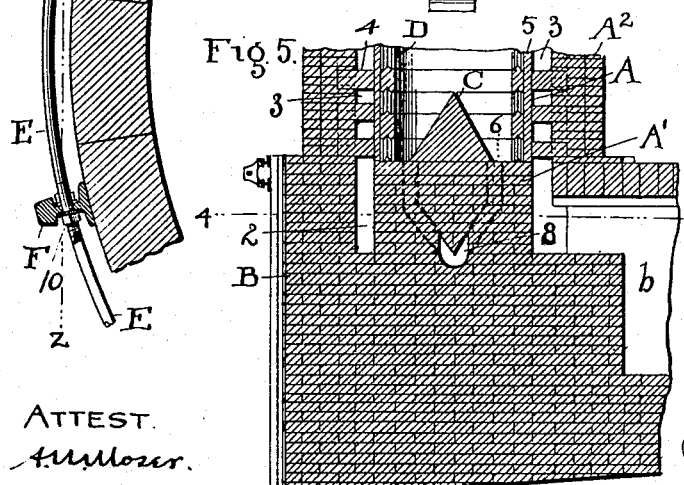
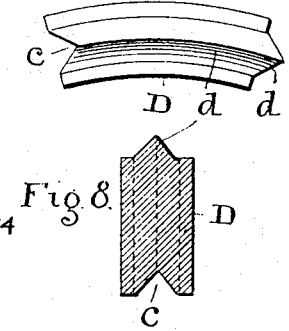
ATTEST.
A. M. Moser.
R. B. Moser.
INVENTOR.
Philip P. Nungesser
By H. T. Fisher ATTY.

UNITED STATES PATENT OFFICE.

PHILIP P. NUNGESSER, OF CLEVELAND, OHIO, ASSIGNOR TO THE NUNGESSER ELECTRIC BATTERY CO., OF CLEVELAND, OHIO, A CORPORATION OF OHIO.

CARBON-CALCINING FURNACE.

No. 824,199.      Specification of Letters Patent.      Patented June 26, 1906.

Application filed September 18, 1905. Serial No. 278,956.

*To all whom it may concern:*

Be it known that I, PHILIP P. NUNGESSER, a citizen of the United States, residing at Cleveland, in the county of Cuyahoga and State of Ohio, have invented certain new and useful Improvements in Carbon-Calcining Furnaces; and I do declare that the following is a full, clear, and exact description of the invention, which will enable others skilled in the art to which it appertains to make and use the same.

My invention relates to new and useful improvements in carbon-calcining furnaces adapted to heat carboniferous or other material continually and without interruption for an indefinite period, the raw material being fed into the top of the retort and the heated material withdrawn from the bottom thereof, all substantially as shown and described, and particularly pointed out in the claims.

In the drawings, Figure 1 is a central vertical sectional elevation of the retort or furnace on a line corresponding to 1 1, Fig. 3. Fig. 2 is a vertical section of the space between the inner and outer walls on a line corresponding to 2 2, Fig. 1, showing the staggered arrangement of the tile in said space or flue for the products of combustion. Fig. 3 is a cross-section of the retort corresponding to line 3 3, Fig. 1; and Fig. 4 is a cross-section of the base corresponding to line 4 4, Fig. 5. Fig. 5 is a vertical sectional elevation of the retort and base on a line corresponding to line 5 5, Fig. 4. Fig. 6 is an enlarged horizontal section of a portion of the outer wall of the retort and illustrating my novel means for binding the furnace round about with a yielding board or tie. Figs. 7 and 8 are edge and cross-sectional views, respectively, of the interlocking tile for lining the interior of the retort.

As thus shown and described, the invention comprises a novel construction of furnace or retort A, preferably cylindrical or circular in shape, but not necessarily limited to this form, and built upon a base B, in which or in connection with which there is a combustion-chamber or firing-space $b$, which may be of any preferred or available kind, whether with solid or gaseous fuel.

From the combustion-chamber the products of combustion pass into an annular heat-distributing space 2, which surrounds the interior base portion $A'$, upon which the immediate wall A of the retort or furnace rests. From the said annular space 2 the products of combustion pass upward uniformly about the wall A of the retort proper through a passage-way 3, that is more or less interrupted by the interposition of tile or bricks 4, which are built into the outer inclosing wall $A^2$ of the retort and extend across said passage in staggered relations, Fig. 2, against the outer tile covering 5 of the inner wall A. The tiles 4 necessarily are of refractory material which will resist very high temperatures, as they are bodily exposed in the path of the products of combustion. The interposition of the said tiles or bricks 4 does not, however, disturb the flow of the products of combustion to any such extent that the heating of the retort on the higher elevations is injuriously affected thereby, while said tiles afford all the lateral support the inner wall of the retort requires and stay the same uniformly all around from end to end. The said wall A has an interior lining of especially-constructed interlocking tiles D, formed with more or less segmental curvature between their ends, according to the dimensions of the retort and provided with tongues $d$ and grooves $c$ upon opposite edges and ends, respectively, as seen in Figs. 7 and 8. The inner lengths of these tiles is proportionally shorter than the outer, according to the curvature provided for therein, and they are set into the wall A in interlocking position at both their ends and edges, as seen in Figs. 3 and 5. This construction, with the effective bracing obtained through the staggered tiles or bricks 4, makes an exceedingly serviceable wall and effectually prevents leakage of solid matter or gases from within the retort into the draft-flues about the same.

Another material and novel feature of this construction of retort is the cone C in the bottom thereof, which is especially designed to promote a uniform flow of the heated material by gravity from the bottom of the retort into the discharge-passages. Heretofore in all retorts of this general character with which I am familiar the outlet-opening was directly in the center of the bottom and with more or less ledge or floor space about said hole around about the wall. This made a lodging place at the wall about said hole for the material when drawing off occurred, and the result was that the material packed thereon and induced a run down through the center of the pile which would bring with it much of the unprepared material from toward the top of the retort. Such material being insufficiently heated, would have to be separated out and put back into the retort, entailing much additional labor and showing very imperfect apparatus obviously. Now I have devised a construction which wholly avoids this objection and insures a uniform bodily-downward movement of the entire mass as the bottom material is drawn away, and the said cone especially and initially contributes to this result—that is, it enters into the pile or column of material as a conical wedge with such declivity that there is no tendency to pack or settle thereon while the several discharge-passages 6, starting from about the base of said cone and between the same and wall A, tap the superposed material at such frequent intervals here and there that it will pour out through the same into the common space where said passages meet at the mouth of the single downwardly-inclined discharge-channel 8 and thence out under control of cut-off 9, Fig. 1. There may be as many of the passages 6 as shall be found necessary to obtain uniform clearance from the bottom of the retort, and I find that by this construction all the outflow is from the bottom of the stack while the material next above settles down to take its place and no raw or unprepared material whatever can be drawn off.

Another essential and novel feature of this retort or furnace is the means provided for accommodating the unavoidable contraction and expansion of the wall of the furnace or retort, incident to the high temperature at times and the contraction when cooling is necessary. The circular form of the retort is especially favorable to my conception, which consists in an elastic binder or tie E at intervals from top to bottom with vertically-disposed rails or bars F at intervals about the wall and preferably the full length thereof, so that each rail will reach from the base of the wall to the top thereof. These rails, preferably, are railway-rails arranged with their base against the wall of the stack or retort and having the ties E passed through the web of the rail, Fig. 6. The ends of the ties overlap at and through adjacent rails, where the said ends are threaded and provided with nuts 10 to draw the said ties or rods to the requisite tightness to begin with and to make such further adjustment as the demands of the service may require.

It will be noticed that normally the tie-rods are bent to a circle conforming generally to but of proportionally larger radius than the radius of the outer walls which they inclose and are purposely of spring metal, so as to naturally hold or resume this circular or curved relation. Now it will be seen that in case of expansion of the walls of the retort under heat there must be proportional expansion or yield in the tie-rods E or breakage will ensue. This is the point wherein my novel form of tie or binder shows its advantage, because it will automatically surrender in proportion to the expansion until it assumes a perfectly straight or stretched position between rails, as seen in line $z\ z$, Fig. 6. This is its limit; but it is not expected that the limit will be required in the every-day use of the retort, and then as the retort cools and contraction occurs the said rods E naturally spring back toward their original curved position with the contraction of the walls. This makes the ties E elastic, while they exert a continuous binding effect or pressure upon the exterior of the wall and compensate for both expansion and contraction of the wall. Of course any other suitable form of rail or bar F may be used.

In Fig. 1, G represents a storage-tank for the raw material and from which the retort is supplied through a discharge-spout 12. The said tank or receptacle has a funnel-shaped or conical bottom $g$, and the flow of the material therefrom through spout 12 is controlled by a valve 14. A tile-lined cover H carries spout or tube 12, and a ventilating-flue J for the retort is shown as extending through said cover. Suitable posts or standards 17 support tank G from the top of the retort stack or wall. Means are provided at 16, Fig. 1, for ascertaining the temperature of the interior walls and flues of the retort, and suitable cleansing-doors 18 are provided here and there in the wall of the retort.

N is a side flue at the top of the retort for the escape of the products of combustion, controlled by a slide or damper $n$.

Tank G is of a size which enables an extra quantity of material to be stored in convenient reach of the retort for holidays and the like, so that as a charge is withdrawn from the retort—say every six hours—the retort may be filled from the supply on hand in the tank by simply pulling on chain 20 and raising valve 14.

What I claim is—

1. A carbon-calcining furnace having a wall with a lining of interlocked tiles, an outer wall and tiles built therein bearing against the wall of the retort at intervals, and ties about said outer wall binding the same around and holding said walls together, a passage for combustion being provided between said walls.

2. A carbon-calcining furnace having a circular outer wall, in combination with vertically-disposed rails at intervals about said wall and spring-metal tie-rods bent to a radius greater than the radius of said wall and engaged through said rails and locking the same together against said wall.

3. An upright carbon-calcining furnace having a cone centrally on the bottom thereof and a space between the base of the cone and the wall of the retort, and a plurality of outlets for the material open to said space, said outlets running together at their bottom.

4. A vertically-disposed carbon-calcining furnace and a base therefor having an annular combustion-channel about the same, a cone centrally in the bottom of said retort and outlet-passages about said cone extending down through said base.

5. An upright carbon-calcining furnace of tubular form, a cone centrally in the bottom thereof of less width at its base than the bottom of the retort, a series of outlet-passages disposed at intervals about said cone and a discharge-channel to which said passages converge.

In testimony whereof I sign this specification in the presence of two witnesses.

PHILIP P. NUNGESSER.

Witnesses:
  R. B. MOSER,
  C. A. SELL.